US008928676B2

(12) United States Patent
Steiner et al.

(10) Patent No.: US 8,928,676 B2
(45) Date of Patent: Jan. 6, 2015

(54) METHOD FOR PARALLEL FINE RASTERIZATION IN A RASTER STAGE OF A GRAPHICS PIPELINE

(75) Inventors: Walter R. Steiner, Flagler Beach, FL (US); Franklin C. Crow, Portola Valley, CA (US); Craig M. Wittenbrink, Palo Alto, CA (US); Roger L. Allen, Lak Oswage, OR (US); Douglas A. Voorhies, Menlo Park, CA (US)

(73) Assignee: Nvidia Corporation, Santa Clara, CA (US)

( * ) Notice: Subject to any disclaimer, the term of this patent is extended or adjusted under 35 U.S.C. 154(b) by 376 days.

(21) Appl. No.: 11/474,027

(22) Filed: Jun. 23, 2006

(65) Prior Publication Data
US 2007/0296725 A1 Dec. 27, 2007

(51) Int. Cl.
*G06F 15/80* (2006.01)
*G06T 15/00* (2011.01)
*G06T 11/40* (2006.01)

(52) U.S. Cl.
CPC ............... *G06T 11/40* (2013.01); *G06T 15/005* (2013.01)
USPC ........................................................ 345/505

(58) Field of Classification Search
USPC ................................... 345/426, 505; 713/323
See application file for complete search history.

(56) References Cited

U.S. PATENT DOCUMENTS

| 4,208,810 | A | 6/1980 | Rohner et al. |
| 4,918,626 | A | 4/1990 | Watkins et al. |
| 5,081,594 | A | 1/1992 | Horsley |
| 5,287,438 | A | 2/1994 | Kelleher |
| 5,313,287 | A | 5/1994 | Barton |
| 5,432,898 | A | 7/1995 | Curb et al. |
| 5,446,836 | A | 8/1995 | Lentz et al. |
| 5,452,104 | A | 9/1995 | Lee |
| 5,452,412 | A | 9/1995 | Johnson, Jr. et al. |
| 5,483,258 | A | 1/1996 | Cornett et al. |
| 5,543,935 | A | 8/1996 | Harrington |
| 5,570,463 | A | 10/1996 | Dao |
| 5,594,854 | A | 1/1997 | Baldwin et al. |
| 5,623,692 | A | 4/1997 | Priem et al. |
| 5,633,297 | A | 5/1997 | Valko et al. |

(Continued)

FOREIGN PATENT DOCUMENTS

| CN | 101093578 | 12/2007 |
| JP | 06180758 | 6/1994 |

(Continued)

OTHER PUBLICATIONS

A hardware assisted design rule check architecture Larry Seiler Jan. 1982 Proceedings of the 19th conference on design automation DAC '82 Publisher: IEEE Press.

(Continued)

*Primary Examiner* — Phi Hoang

(57) ABSTRACT

In a raster stage of a graphics processor, a method for parallel fine rasterization. The method includes receiving a graphics primitive for rasterization in a raster stage of a graphics processor. The graphics primitive is rasterized at a first level to generate a plurality of tiles of pixels. The titles are subsequently rasterized at a second level by allocating the tiles to an array of parallel second-level rasterization units to generate covered pixels. The covered pixels are then output for rendering operations in a subsequent stage of the graphics processor.

19 Claims, 12 Drawing Sheets

(56) References Cited

U.S. PATENT DOCUMENTS

| | | |
|---|---|---|
| 5,664,162 A | 9/1997 | Dye |
| 5,815,162 A | 9/1998 | Levine |
| 5,854,631 A | 12/1998 | Akeley et al. |
| 5,854,637 A | 12/1998 | Sturges |
| 5,872,902 A | 2/1999 | Kuchkuda et al. |
| 5,977,987 A | 11/1999 | Duluk, Jr. |
| 6,028,608 A | 2/2000 | Jenkins |
| 6,034,699 A | 3/2000 | Wong et al. |
| 6,072,500 A | 6/2000 | Foran et al. |
| 6,104,407 A | 8/2000 | Aleksic et al. |
| 6,104,417 A | 8/2000 | Nielsen et al. |
| 6,115,049 A | 9/2000 | Winner et al. |
| 6,118,394 A | 9/2000 | Onaya |
| 6,128,000 A | 10/2000 | Jouppi et al. |
| 6,137,918 A | 10/2000 | Harrington et al. |
| 6,160,557 A | 12/2000 | Narayanaswami |
| 6,160,559 A | 12/2000 | Omtzigt |
| 6,188,394 B1 | 2/2001 | Morein et al. |
| 6,201,545 B1 | 3/2001 | Wong et al. |
| 6,204,859 B1 | 3/2001 | Jouppi et al. |
| 6,219,070 B1 | 4/2001 | Baker et al. |
| 6,249,853 B1 | 6/2001 | Porterfield |
| 6,259,460 B1 | 7/2001 | Gossett et al. |
| 6,323,874 B1 | 11/2001 | Gossett |
| 6,359,623 B1 | 3/2002 | Larson |
| 6,362,819 B1 | 3/2002 | Dalal et al. |
| 6,366,289 B1 | 4/2002 | Johns |
| 6,429,877 B1 | 8/2002 | Stroyan |
| 6,437,780 B1 | 8/2002 | Baltaretu et al. |
| 6,452,595 B1 | 9/2002 | Montrym et al. |
| 6,469,707 B1 | 10/2002 | Voorhies |
| 6,480,205 B1 | 11/2002 | Greene et al. |
| 6,501,564 B1 | 12/2002 | Schramm et al. |
| 6,504,542 B1 | 1/2003 | Voorhies et al. |
| 6,522,329 B1 | 2/2003 | Ihara et al. |
| 6,525,737 B1 | 2/2003 | Duluk, Jr. et al. |
| 6,529,207 B1 | 3/2003 | Landau et al. |
| 6,606,093 B1 | 8/2003 | Gossett et al. |
| 6,611,272 B1 | 8/2003 | Hussain et al. |
| 6,614,444 B1 | 9/2003 | Duluk, Jr. et al. |
| 6,614,448 B1 | 9/2003 | Garlick et al. |
| 6,624,823 B2 | 9/2003 | Deering |
| 6,633,197 B1 | 10/2003 | Sutardja |
| 6,633,297 B2 | 10/2003 | McCormack et al. |
| 6,646,639 B1 | 11/2003 | Greene et al. |
| 6,671,000 B1 | 12/2003 | Cloutier |
| 6,693,637 B2 | 2/2004 | Koneru et al. |
| 6,693,639 B2 | 2/2004 | Duluk, Jr. et al. |
| 6,697,063 B1 | 2/2004 | Zhu |
| 6,717,576 B1 | 4/2004 | Duluk, Jr. et al. |
| 6,717,578 B1 | 4/2004 | Deering |
| 6,734,861 B1 | 5/2004 | Van Dyke et al. |
| 6,741,247 B1 | 5/2004 | Fenney |
| 6,747,057 B2 | 6/2004 | Ruzafa et al. |
| 6,765,575 B1 | 7/2004 | Voorhies et al. |
| 6,778,177 B1 | 8/2004 | Furtner |
| 6,788,301 B2 | 9/2004 | Thrasher |
| 6,798,410 B1 | 9/2004 | Redshaw et al. |
| 6,803,916 B2 | 10/2004 | Ramani et al. |
| 6,819,332 B2 | 11/2004 | Baldwin |
| 6,833,835 B1 | 12/2004 | van Vugt |
| 6,906,716 B2 | 6/2005 | Moreton et al. |
| 6,938,176 B1 * | 8/2005 | Alben et al. ............... 713/323 |
| 6,940,514 B1 | 9/2005 | Wasserman et al. |
| 6,947,057 B2 | 9/2005 | Nelson et al. |
| 6,956,579 B1 * | 10/2005 | Diard et al. ............... 345/537 |
| 6,961,057 B1 | 11/2005 | Van Dyke et al. |
| 6,978,317 B2 | 12/2005 | Anantha et al. |
| 7,002,591 B1 | 2/2006 | Leather et al. |
| 7,009,607 B2 | 3/2006 | Lindholm et al. |
| 7,009,615 B1 | 3/2006 | Kilgard et al. |
| 7,061,495 B1 | 6/2006 | Leather |
| 7,064,771 B1 | 6/2006 | Jouppi et al. |
| 7,075,542 B1 * | 7/2006 | Leather ............... 345/505 |
| 7,081,902 B1 | 7/2006 | Crow et al. |
| 7,119,809 B1 | 10/2006 | McCabe |
| 7,126,600 B1 | 10/2006 | Fowler et al. |
| 7,154,066 B2 | 12/2006 | Talwar et al. |
| 7,158,148 B2 | 1/2007 | Toji et al. |
| 7,170,515 B1 | 1/2007 | Zhu |
| 7,184,040 B1 | 2/2007 | Tzvetkov |
| 7,224,364 B1 | 5/2007 | Yue et al. |
| 7,307,628 B1 | 12/2007 | Goodman et al. |
| 7,307,638 B2 | 12/2007 | Leather et al. |
| 7,382,368 B1 | 6/2008 | Molnar et al. |
| 7,453,466 B2 | 11/2008 | Hux et al. |
| 7,483,029 B2 | 1/2009 | Crow et al. |
| 7,548,996 B2 | 6/2009 | Baker et al. |
| 7,551,174 B2 | 6/2009 | Iourcha et al. |
| 7,633,506 B1 | 12/2009 | Leather et al. |
| 7,634,637 B1 | 12/2009 | Lindholm et al. |
| 7,791,617 B2 | 9/2010 | Crow et al. |
| 7,965,902 B1 | 6/2011 | Zelinka et al. |
| 8,022,957 B2 * | 9/2011 | Ishikawa ............... 345/505 |
| 8,063,903 B2 | 11/2011 | Vignon et al. |
| 8,698,811 B1 | 4/2014 | Crow et al. |
| 2001/0005209 A1 | 6/2001 | Lindholm et al. |
| 2002/0050979 A1 | 5/2002 | Oberoi et al. |
| 2002/0097241 A1 | 7/2002 | McCormack et al. |
| 2002/0130863 A1 | 9/2002 | Baldwin |
| 2002/0140655 A1 | 10/2002 | Liang et al. |
| 2002/0158885 A1 | 10/2002 | Brokenshire et al. |
| 2002/0196251 A1 | 12/2002 | Duluk, Jr. et al. |
| 2003/0067468 A1 | 4/2003 | Duluk, Jr. et al. |
| 2003/0076325 A1 | 4/2003 | Thrasher |
| 2003/0122815 A1 | 7/2003 | Deering |
| 2003/0163589 A1 | 8/2003 | Bunce et al. |
| 2003/0194116 A1 | 10/2003 | Wong et al. |
| 2003/0201994 A1 | 10/2003 | Taylor et al. |
| 2004/0085313 A1 | 5/2004 | Moreton et al. |
| 2004/0130552 A1 | 7/2004 | Duluk, Jr. et al. |
| 2004/0183801 A1 | 9/2004 | Deering |
| 2004/0196285 A1 | 10/2004 | Rice et al. |
| 2004/0207642 A1 | 10/2004 | Crisu et al. |
| 2004/0246251 A1 | 12/2004 | Fenney et al. |
| 2005/0030314 A1 | 2/2005 | Dawson |
| 2005/0041037 A1 | 2/2005 | Dawson |
| 2005/0052449 A1 | 3/2005 | Emberling |
| 2005/0066148 A1 * | 3/2005 | Luick ............... 712/1 |
| 2005/0122338 A1 | 6/2005 | Hong et al. |
| 2005/0134588 A1 | 6/2005 | Aila et al. |
| 2005/0134603 A1 | 6/2005 | Iourcha et al. |
| 2005/0179698 A1 | 8/2005 | Vijayakumar et al. |
| 2005/0259100 A1 | 11/2005 | Teruyama |
| 2006/0044317 A1 | 3/2006 | Bourd et al. |
| 2006/0170690 A1 | 8/2006 | Leather |
| 2006/0170703 A1 | 8/2006 | Liao |
| 2006/0200651 A1 * | 9/2006 | Collopy et al. ............... 712/220 |
| 2006/0203005 A1 | 9/2006 | Hunter |
| 2006/0245001 A1 | 11/2006 | Lee et al. |
| 2006/0267981 A1 * | 11/2006 | Naoi ............... 345/426 |
| 2007/0050647 A1 * | 3/2007 | Conroy et al. ............... 713/300 |
| 2007/0139440 A1 | 6/2007 | Crow et al. |
| 2007/0268298 A1 | 11/2007 | Alben et al. |
| 2007/0273689 A1 | 11/2007 | Tsao |
| 2007/0296725 A1 | 12/2007 | Steiner et al. |
| 2008/0024497 A1 | 1/2008 | Crow et al. |
| 2008/0024522 A1 | 1/2008 | Crow et al. |
| 2008/0100618 A1 | 5/2008 | Woo et al. |
| 2008/0273218 A1 | 11/2008 | Kitora et al. |

FOREIGN PATENT DOCUMENTS

| | | |
|---|---|---|
| JP | 10134198 | 5/1998 |
| JP | 11195132 | 7/1999 |
| JP | 2005182547 | 7/2005 |
| WO | 0013145 | 3/2000 |

OTHER PUBLICATIONS

A parallel algorithm for polygon rasterization Juan Pineda Jun. 1988 ACM.

A VLSI architecture for updating raster-scan displays Satish Gupta, Robert F. Sproull, Ivan E. Sutherland Aug. 1981 ACM SIGGRAPH Computer Graphics, Proceedings of the 8th annual conference on

(56) References Cited

OTHER PUBLICATIONS

Computer graphics and interactive techniques SIGGRAPH '81, vol. 15 Issue 3 Publisher: ACM Press.

Blythe, OpenGL Section 3A.1, "Basic Line Segment Rasterization", Mar. 29, 1997, pp. 1-3.

Boyer, et al.; "Discrete Analysis for Antialiased Lines;" Eurographics 2000; 3 Pages.

Crow; "The Use of Grayscale for Improves Raster Display of Vectors and Characters," University of Texas, Austin, Texas; Work supported by the National Science Foundation unser Grant MCS 76-83889; pp. 1-5.

Foley, J. "Computer Graphics: Principles and Practice", 1987, Addison-Wesley Publishing, 2nd Edition, p. 545-546.

Fuchs; "Fast Spheres Shadow, Textures, Transparencies, and Image Enhancements in Pixel-Planes"; ACM; 1985; Department of Computer Science, University of North Carolina at Chapel Hill, Chapel Hill, NC 27514.

* cited by examiner

| 0 | 1 | 2 | 3 | 4 | 5 | 6 | 7 | 0 | 1 | 2 | 3 | 4 | 5 |
|---|---|---|---|---|---|---|---|---|---|---|---|---|---|
| 3 | 4 | 5 | 6 | 7 | 0 | 1 | 2 | 3 | 4 | 5 | 6 | 7 | 0 |
| 6 | 7 | 0 | 1 | 2 | 3 | 4 | 5 | 6 | 7 | 0 | 1 | 2 | 3 |
| 1 | 2 | 3 | 4 | 5 | 6 | 7 | 0 | 1 | 2 | 3 | 4 | 5 | 6 |
| 4 | 5 | 6 | 7 | 0 | 1 | 2 | 3 | 4 | 5 | 6 | 7 | 0 | 1 |
| 7 | 0 | 1 | 2 | 3 | 4 | 5 | 6 | 7 | 0 | 1 | 2 | 3 | 4 |
| 2 | 3 | 4 | 5 | 6 | 7 | 0 | 1 | 2 | 3 | 4 | 5 | 6 | 7 |
| 5 | 6 | 7 | 0 | 1 | 2 | 3 | 4 | 5 | 6 | 7 | 0 | 1 | 2 |
| 0 | 1 | 2 | 3 | 4 | 5 | 6 | 7 | 0 | 1 | 2 | 3 | 4 | 5 |
| 3 | 4 | 5 | 6 | 7 | 0 | 1 | 2 | 3 | 4 | 5 | 6 | 7 | 0 |

FIG. 10

METHOD FOR PARALLEL FINE RASTERIZATION IN A RASTER STAGE OF A GRAPHICS PIPELINE

CROSS REFERENCE TO RELATED APPLICATIONS

This application is related to, and incorporates by reference, the following commonly assigned U.S. patent applications:

A METHOD FOR RASTERIZING NON-RECTANGULAR TILE GROUPS IN A RASTER STAGE OF A GRAPHICS PIPELINE, by Justin Legakis et al., filed on Jun. 23, 2006, Ser. No. 11/474,161;

A GPU HAVING RASTER COMPONENTS CONFIGURED FOR USING NESTED BOUSTROPHEDONIC PATTERNS TO TRAVERSE SCREEN AREAS" by Franklin C. Crow et al., Ser. No. 11/304,904, filed on Dec. 15, 2005; and A SYSTEM AND METHOD FOR INCREASING DIE YIELD" by John Montrym et al., filed on Dec. 18, 2003, Ser. No. 10/740,723.

FIELD OF THE INVENTION

The present invention is generally related to hardware accelerated graphics computer systems.

BACKGROUND OF THE INVENTION

Recent advances in computer performance have enabled graphic systems to provide more realistic graphical images using personal computers, home video game computers, handheld devices, and the like. In such graphic systems, a number of procedures are executed to "render" or draw graphic primitives to the screen of the system. A "graphic primitive" is a basic component of a graphic picture, such as a point, line, polygon, or the like. Rendered images are formed with combinations of these graphic primitives. Many procedures may be utilized to perform 3-D graphics rendering.

Specialized graphics processing units (e.g., GPUs, etc.) have been developed to optimize the computations required in executing the graphics rendering procedures. The GPUs are configured for high-speed operation and typically incorporate one or more rendering pipelines. Each pipeline includes a number of hardware-based functional units that are optimized for high-speed execution of graphics instructions/data, where the instructions/data are fed into the front end of the pipeline and the computed results emerge at the back end of the pipeline. The hardware-based functional units, cache memories, firmware, and the like, of the GPU are optimized to operate on the low-level graphics primitives (e.g., comprising "points", "lines", "triangles", etc.) and produce real-time rendered 3-D images.

The real-time rendered 3-D images are generated using raster display technology. Raster display technology is widely used in computer graphics systems, and generally refers to the mechanism by which the grid of multiple pixels comprising an image are influenced by the graphics primitives. For each primitive, a typical rasterization system generally steps from pixel to pixel and determines whether or not to "render," or write a given pixel into a frame buffer or pixel map, as per the contribution of the primitive. This, in turn, determines how to write the data to the display buffer representing each pixel.

Various traversal algorithms and various rasterization methods have been developed for computing from a graphics primitive based description to a pixel based description (e.g., rasterizing pixel to pixel per primitive) in a way such that all pixels within the primitives comprising a given 3-D scene are covered. For example, some solutions involve generating the pixels in a unidirectional manner. Such traditional unidirectional solutions involve generating the pixels row-by-row in a constant direction. This requires that the sequence shift across the primitive to a starting location on a first side of the primitive upon finishing at a location on an opposite side of the primitive.

Other traditional methods involve utilizing per pixel evaluation techniques to closely evaluate each of the pixels comprising a display and determine which pixels are covered by which primitives. The per pixel evaluation involves scanning across the pixels of a display to determine which pixels are touched/covered by the edges of a graphics primitive.

Once the primitives are rasterized into their constituent pixels, these pixels are then processed in pipeline stages subsequent to the rasterization stage where the rendering operations are performed. Generally, these rendering operations assign a color to each of the pixels of a display in accordance with the degree of coverage of the primitives comprising a scene. The per pixel color is also determined in accordance with texture map information that is assigned to the primitives, lighting information, and the like.

A problem exists however with the ability of prior art 3-D rendering architectures to scale to handle the increasingly complex 3-D scenes of today's applications. Computer screens now commonly have screen resolutions of 1920× 1200 pixels or larger. Traditional methods of increasing 3-D rendering performance, such as, for example, increasing clock speed, have negative side effects such as increasing power consumption and increasing the heat produced by the GPU integrated circuit die. Other methods for increasing performance, such as incorporating large numbers of parallel execution units for parallel execution of GPU operations have negative side effects such as increasing integrated circuit die size, decreasing yield of the GPU manufacturing process, increasing power requirements, and the like.

Thus, a need exists for a rasterization process that can scale as graphics application needs require and provide added performance without incurring penalties such as increased power consumption and/or reduced fabrication yield.

SUMMARY OF THE INVENTION

Embodiments of the present invention provide a method and system for a rasterization process that can scale as graphics application needs require and provide added performance without incurring penalties such as increased power consumption and/or reduced fabrication yield.

In one embodiment, the present invention is implemented as a method for parallel fine rasterization in a raster stage of a graphics processor. The method includes receiving a graphics primitive (e.g., a triangle polygon) for rasterization in a raster stage of the graphics processor. The graphics primitive is rasterized at a first level to generate a plurality of tiles of pixels. The first level rasterization can be implemented using a coarse raster unit within the raster stage. The titles are subsequently rasterized at a second level by allocating the tiles to an array of parallel second-level rasterization units to generate covered pixels. The second-level rasterization can be implemented using an array of parallel fine raster units. The resulting covered pixels produced by the second-level rasterization are then output for rendering operations in a subsequent stage of the graphics processor.

In one embodiment, the use of large tiles by the coarse raster unit allows the first level rasterization to be implemented on a per clock cycle basis. Similarly, the use of multiple parallel fine raster units allow the rasterization at the second-level to be implemented in parallel on a per clock cycle basis. This aspect can greatly improve the scalability and the overall performance of the graphics rendering process.

In one embodiment, the plurality of fine raster units are substantially identical. The plurality of tiles can be allocated to the array of fine raster units to balance a workload among the fine raster units. Additionally, in one embodiment the use of multiple parallel fine raster units can provide a redundant rasterization capability. This redundant rasterization attribute can enable a selective functional component activation/deactivation capability for the array. For example, one or more of the fine raster units can be deactivated if necessary (e.g., due to a fault condition, to achieve a target power consumption level, etc.).

BRIEF DESCRIPTION OF THE DRAWINGS

The present invention is illustrated by way of example, and not by way of limitation, in the figures of the accompanying drawings and in which like reference numerals refer to similar elements.

FIG. 10 shows a diagram depicting an exemplary load-balancing method in accordance with one embodiment of the present invention.

DETAILED DESCRIPTION OF THE INVENTION

Figure 1:
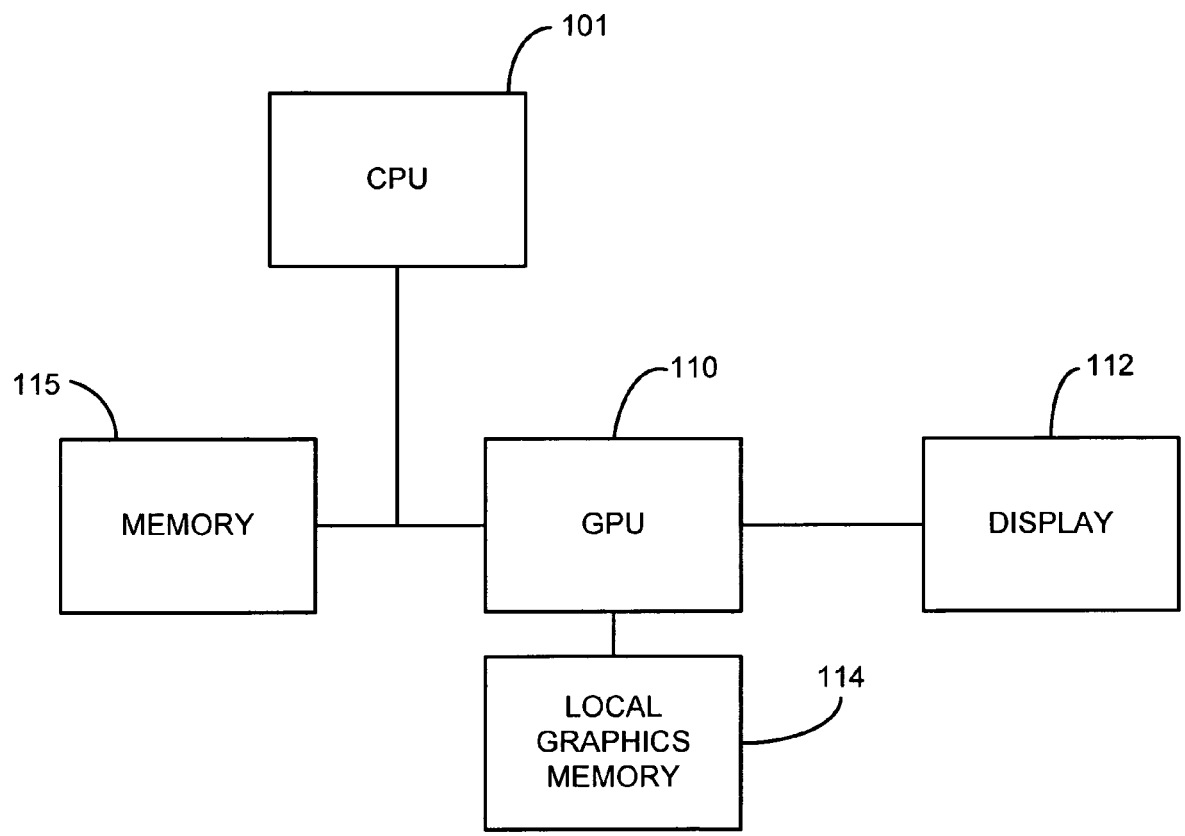
FIG. 1 shows a computer system in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Computer System Platform:

FIG. 1 shows a computer system 100 in accordance with one embodiment of the present invention. Computer system 100 depicts the components of a basic computer system in accordance with embodiments of the present invention providing the execution platform for certain hardware-based and software-based functionality. In general, computer system 100 comprises at least one CPU 101, a system memory 115, and at least one graphics processor unit (GPU) 110. The CPU 101 can be coupled to the system memory 115 via a bridge component/memory controller (not shown) or can be directly coupled to the system memory 115 via a memory controller (not shown) internal to the CPU 101. The GPU 110 is coupled to a display 112. One or more additional GPUs can optionally be coupled to system 100 to further increase its computational power. The GPU(s) 110 is coupled to the CPU 101 and the system memory 115. System 100 can be implemented as, for example, a desktop computer system or server computer system, having a powerful general-purpose CPU 101 coupled to a dedicated graphics rendering GPU 110. In such an embodiment, components can be included that add peripheral buses, specialized graphics memory, IO devices, and the like. Similarly, system 100 can be implemented as a handheld device (e.g., cellphone, etc.) or a set-top video game console device such as, for example, the Xbox®, available from Microsoft Corporation of Redmond, Wash., or the PlayStation3®, available from Sony Computer Entertainment Corporation of Tokyo, Japan.

It should be appreciated that the GPU 110 can be implemented as a discrete component, a discrete graphics card designed to couple to the computer system 100 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, a local graphics memory 114 can be included for the GPU 110 for high bandwidth graphics data storage.

EMBODIMENTS OF THE INVENTION

Embodiments of the present invention implement a method and system for rasterizing arbitrary groups of tiles in a raster stage of a graphics pipeline. Generally, the non-rectangular tile groups are in configurations other than, for example, squares (e.g., 4×4, 8×8, 16×16 titles, etc.) or rectangles (e.g., 4×8, 8×16 titles, etc.). The method includes receiving a graphics primitive (e.g., triangle polygon) for rasterization in a raster stage of a graphics processor (e.g., GPU 110 of FIG. 1). Embodiments of the present invention can implement a multilevel rasterization process.

In one embodiment, the graphics primitive is rasterized at a first level by generating a footprint comprising a set of pixels related to the graphics primitive (e.g., a tile group that covers the primitive). The graphics primitive is then rasterized at a second level by accessing the set of pixels (e.g., the tile group that covers the primitive) and determining covered pixels out of the set. For example, even though the tile group may cover the primitive, not all pixels comprising each tile may cover, or reside within, the graphics primitive. The result of this two level rasterization is pixels that cover, or reside within, the graphics primitive. The raster stage subsequently outputs the covered pixels for rendering operations in a subsequent stage of the graphics processor.

Figure 2:
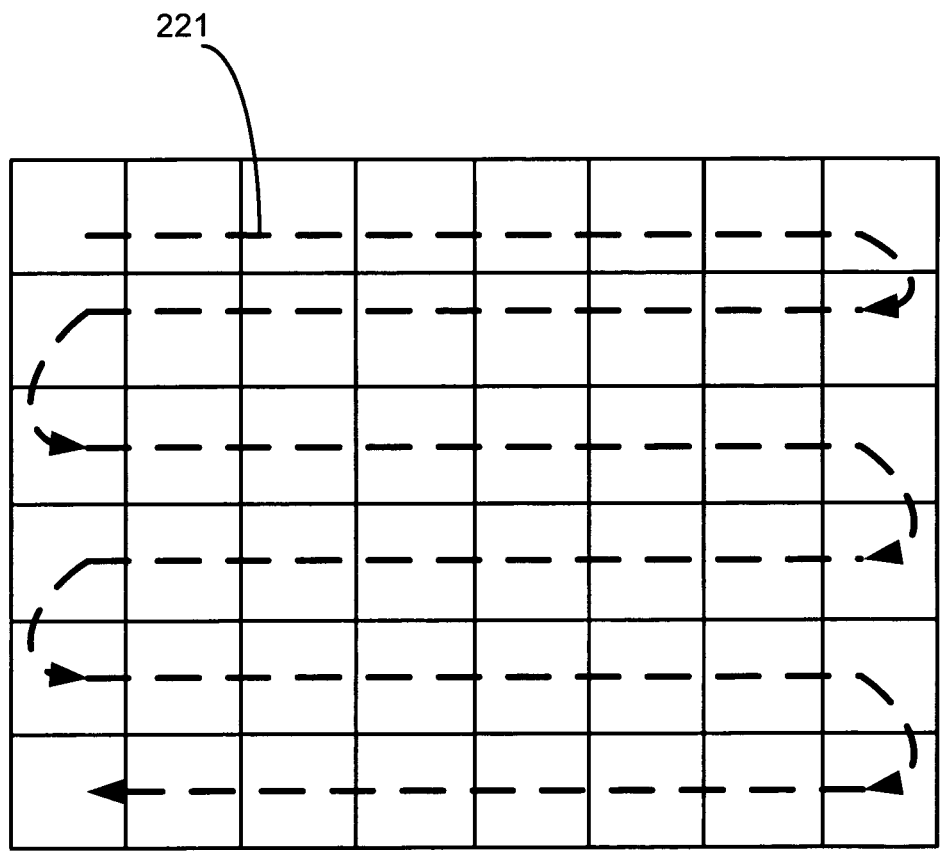
FIG. 2 shows a diagram depicting a grid of pixels being rasterized in a boustrophedonic pattern in accordance with one embodiment of the present invention.

FIG. 2 shows a diagram depicting a grid of pixels being rasterized in a boustrophedonic pattern in accordance with one embodiment of the present invention.

In one embodiment, as depicted in FIG. 2, a raster stage of the GPU 110 utilizes a boustrophedonic pattern for traversing a graphics primitive. As depicted in FIG. 2, the boustrophedonic pattern is indicated by the dotted line 221. In such an embodiment, each pixel of the grid of pixels is traversed in the order indicated by the line 221. The line 221 shows a boustrophedonic pattern of traversal, where the term "boustrophedonic" refers to a traversal pattern which visits all pixels on a 2D area by scanning back and forth along one axis as each pass moves farther along on the orthogonal axis, much as a farmer would plow or mow a field. The term boustrophedonic generally means "as the oxen plows" as in, for example, a field.

Thus, as depicted in FIG. 2, this boustrophedonic rasterization refers to a serpentine pattern that folds back and forth along a predominant axis. In the FIG. 2 example, the predominant axis is horizontal. A horizontal boustrophedonic sequence, for example, may generate all the pixels within a primitive triangle that are on one row from left to right, and then generate the next row right to left, and so on. Such a folded path ensures that an average distance from a generated pixel to recently previously generated pixels is relatively small. Additionally, it should be noted that the boustrophedonic traversal pattern can be implemented on a tile-by-tile basis (e.g., from a generated tile to a recently previously generated tile) as opposed to a pixel-by-pixel basis.

Referring still to FIG. 2, a boustrophedonic pattern for visiting the areas of the screen covered when rasterizing a large primitive (e.g., triangles, etc.) has advantages for maintaining a cache of relevant data and reducing the memory requests required for frame buffer and texture access. For example, generating pixels that are near recently generated pixels is important when recent groups of pixels and/or their corresponding texture values are kept in memories of a limited size (e.g., cache memories, etc.).

Additional details regarding boustrophedonic pattern rasterization can be found in U.S. patent application "A GPU HAVING RASTER COMPONENTS CONFIGURED FOR USING NESTED BOUSTROPHEDONIC PATTERNS TO TRAVERSE SCREEN AREAS" by Franklin C. Crow et al., Ser. No. 11/304,904, filed on Dec. 15, 2005, which is incorporated herein in its entirety.

It should be noted that although embodiments of the present invention are described in the context of boustrophedonic rasterization, other types of rasterization patterns can be used. For example, the algorithms and GPU stages described herein for rasterizing tile groups can be readily applied to traditional left-to-right, line-by-line rasterization patterns.

Figure 3:
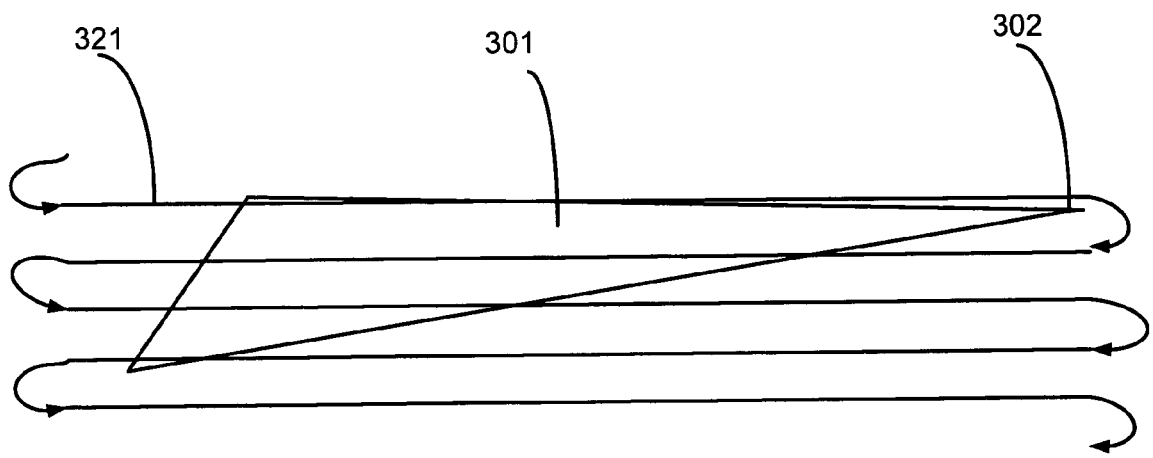
FIG. 3 shows a diagram of a triangle polygon against a rasterization pattern for a raster unit of a GPU in accordance with one embodiment of the present invention.

FIG. 3 shows a diagram of a triangle polygon 301 (e.g., triangle 301) against a rasterization pattern 321 for a raster unit of the GPU 110 in accordance with one embodiment of the present invention.

As described above, the line 321 shows a boustrophedonic pattern of traversal, where the raster unit visits all pixels on a 2D area of the triangle 301 by scanning along one axis as each pass moves farther along on the orthogonal axis. In the FIG. 3 embodiment, this initial rasterization pattern is performed at the first level, or at a coarse rasterization level. A coarse raster unit of the GPU 110 traverses the triangle 301 and stamps out tile groups that cover the triangle 301. These tile groups can be rectangular (e.g., square, rectangular, etc.) in those cases where the triangle 301 is large in comparison to the size of the tile groups and the coarse raster unit is rasterizing pixels well within the interior of the triangle 301. These tile groups can also be non-rectangular in those cases where the triangle 301 is small in comparison to the size of the tile groups and the coarse raster unit is rasterizing pixels near the elongated point of the triangle 301 (e.g., point 302). Generally, the non-rectangular tile groups are in configurations other than, for example, squares (e.g., 4×4, 8×8, 16×16 titles, etc.) or rectangles (e.g., 4×8, 8×16 titles, etc.). As used herein, it should be noted that the term "non-rectangular groups" refers to the attribute whereby groups of tiles that are rasterized in a raster stage are not limited to rectangular or square arrays. Nonrectangular tile groups can be in arbitrary arrangements. For example, in one embodiment, a nonrectangular tile group can include tiles which are not even contiguous with one another.

Figure 4:
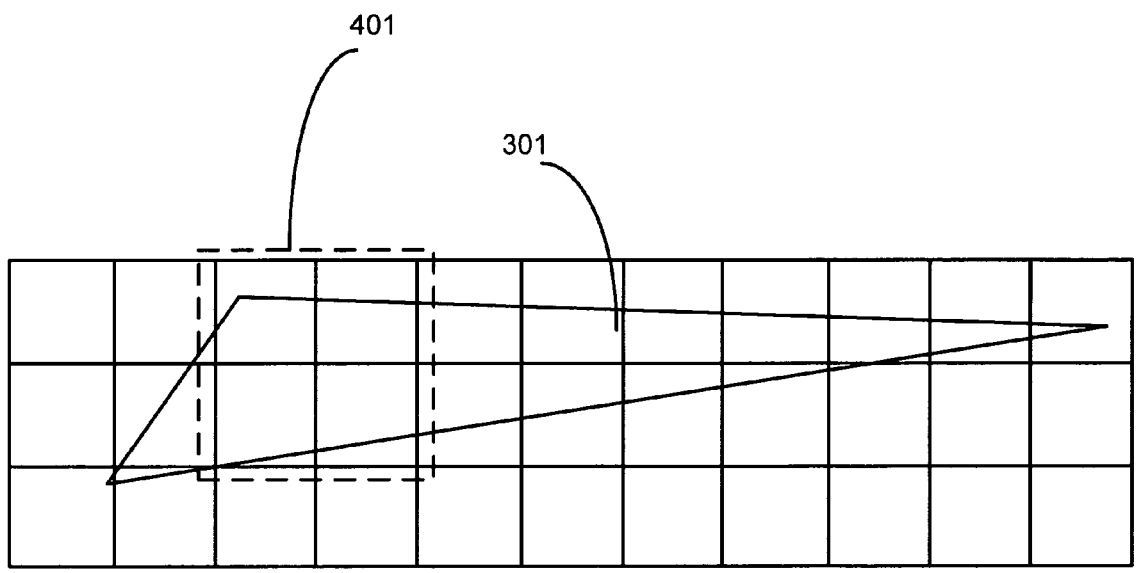
FIG. 4 shows a diagram of the triangle against a grid of tiles as they are being examined by the first level rasterization process in accordance with one embodiment of the present invention.

FIG. 4 shows a diagram of the triangle 301 against a grid of tiles as they are examined by the first level rasterization process in accordance with one embodiment of the present invention. In FIG. 4, each of the illustrated squares represents a tile comprised of pixels (e.g., 8×8, 16×16, etc.). FIG. 4 shows a case where the first level rasterization produces coarse rasterization tile groups comprised of four tiles each, such as the exemplary tile group 401.

As described above, in one embodiment, the first level rasterization generates a tile group, or footprint (e.g., footprint 401) comprising a set of pixels related to the graphics primitive (e.g., a tile group that covers the primitive). Generally, the first level rasterization is intended to quickly determine which pixels of the screen area relate to a given graphics primitive. Accordingly, relatively large groups of pixels (e.g., tiles) are examined at a time in order to quickly find those pixels that relate to the primitive. The process can be compared to a reconnaissance, whereby the coarse raster unit quickly scans a screen area and finds tile groups that cover the triangle 301. Thus the pixels that relate to the triangle 301 can be discovered much more quickly than the traditional prior art process which utilizes a single level of rasterization and examines much smaller numbers of pixels at a time, in a more fine-grained manner.

In the FIG. 4 embodiment, the first level rasterization utilizes a four-tile footprint (e.g., footprint 401) wherein each tile group, or footprint, includes four tiles. Hence, first level rasterization will stamp out four-tile footprints where each footprint has at least one pixel covered by the triangle 301. Thus, first level rasterization is referred to as coarse rasterization since large groups of pixels are examined at a time.

Figure 5:
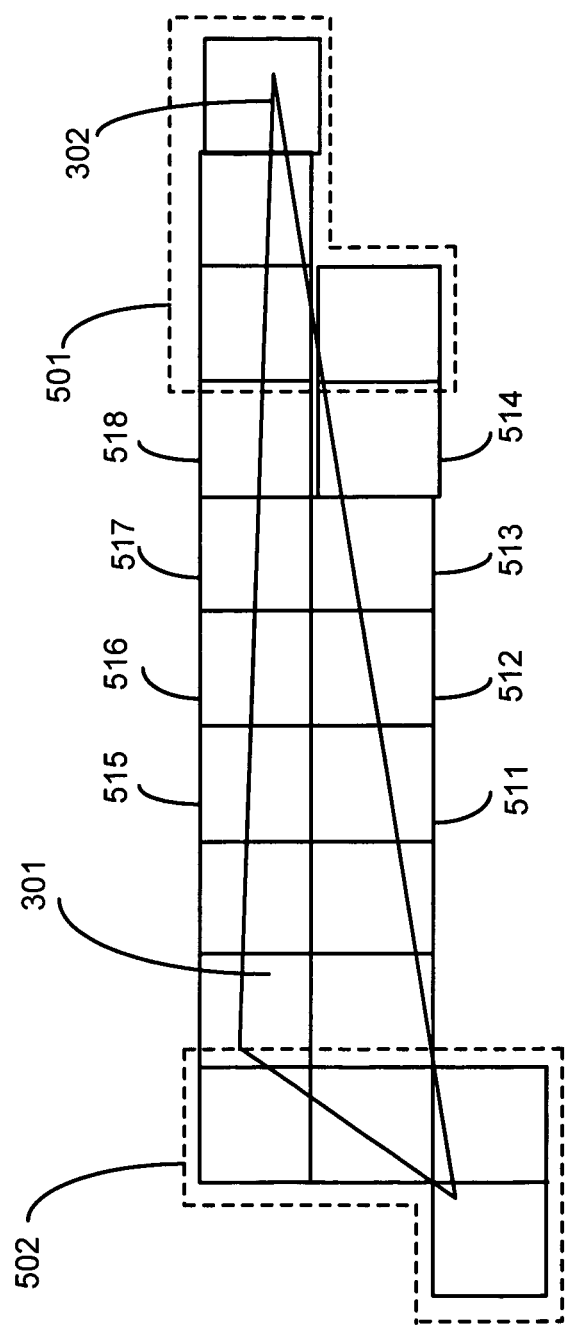
FIG. 5 shows a diagram depicting a plurality of tile groups as stamped out by a coarse raster unit in accordance with one embodiment of the present invention.

FIG. 5 shows a diagram depicting a plurality of tile groups as stamped out by a coarse raster unit in accordance with one embodiment of the present invention. Exemplary tile groups 501 and 502 are shown.

The FIG. 5 the embodiment shows the manner in which the coarse raster stage generates non-rectangular tile groups in order to optimize the degree of coverage of the triangle 301. As described above, a non-rectangular footprint can be used to more efficiently determine which tiles of a screen area are related to a given graphics primitive. The graphics primitive is then rasterized at a second level by accessing the generated tile groups and determining covered pixels out of these tile groups. For example, even though the tile group may cover the primitive, not all pixels comprising each tile may cover, or reside within, the graphics primitive.

FIG. 5 shows exemplary non-rectangular tile groups 501 and 502. The tile groups, or footprints 501-502, are non-rectangular in that their constituent tiles are not arranged in a box or rectangle fashion. In the case of the footprints 501-502, their constituent tiles are stamped out in an "L" pattern as shown. This non-rectangular pattern optimizes the number of covered pixels within the footprints 501-502.

FIG. 5 also shows tiles 511-518. Depending upon their degree of coverage, a raster stage in accordance with one embodiment of the present invention can stamp out tiles 515-518 into a single rectangular tile group (e.g., along the upper edge of the triangle 301) and stamp out tiles 511-514 into a similar rectangular tile group (e.g., along the lower edge of the triangle 301). In this manner, groups of four tiles can be assembled in conglomerations irrespective of the shape of the conglomeration. For example, the conglomerations can be L-shaped, straight-line, square, or the like. The dimensions of the conglomeration of tiles is adjusted in order to optimize the number of covered pixels within the conglomeration.

It should be noted that different numbers of tiles can be implemented in the first level coarse rasterization process. For example, instead of four tiles per footprint, six, eight, or more tiles can be utilized. With such large footprints, the tiles can be combined in a variety of different shapes and in a variety of different patterns in order to best cover a given graphics primitive.

In this manner, the non-rectangular footprint (e.g., footprint 501) stamped out by the raster stage is dimensionally adjustable in accordance with a shape of the graphics primitive (e.g., triangle 301). For example, the non-rectangular footprint can be dimensionally adjusted (e.g., x number of tiles wide by y number of tiles long) to optimize a number of covered pixels comprising the footprint. This attribute is especially useful in those cases where the primitive being rendered is exceptionally long and narrow. Such long narrow triangles commonly arise in applications such as, for example, stencil shadow algorithms. For example, in a case where the triangle 301 is a very long narrow triangle, the number of pixels comprising each tile, and the number of tiles comprising the footprint, can be optimized in order to stamp out footprints having a high proportion of covered pixels. This is especially useful when rasterizing pixels near the point (e.g., point 302) of the triangle.

Figure 6:
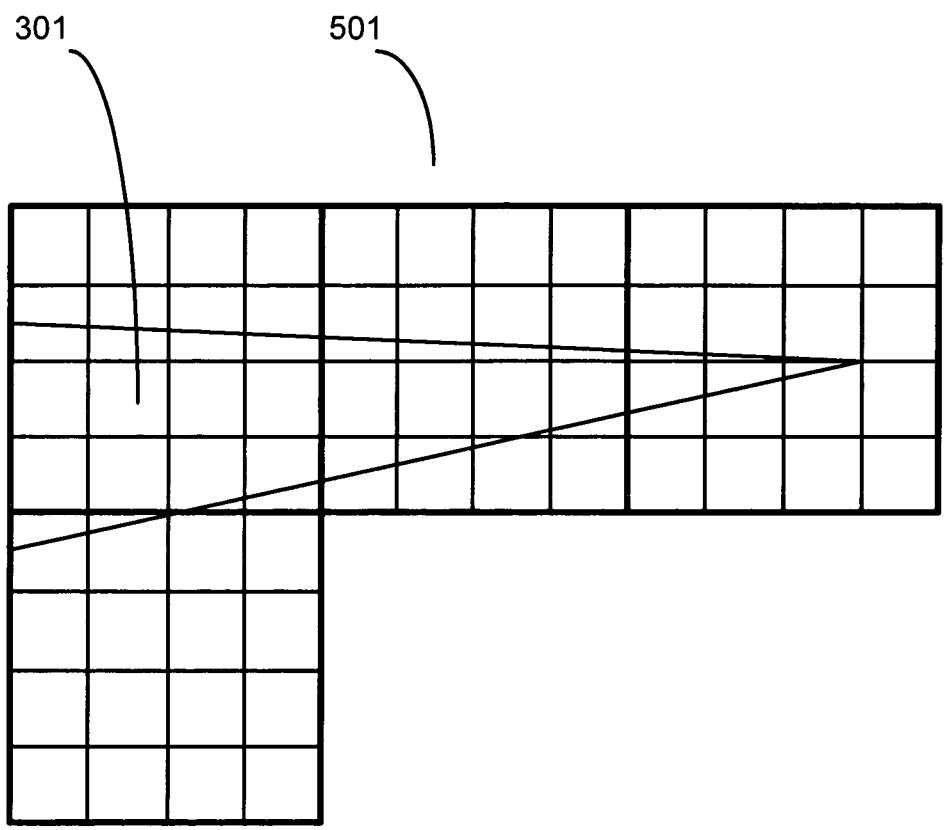
FIG. 6 shows the footprint as it is rasterized using a second level rasterization process in accordance with one embodiment of the present invention.

FIG. 6 illustrates the footprint 501 as it is rasterized using a second level rasterization process in accordance with one embodiment of the present invention. As described above, after coarse rasterization, the triangle 501 is then rasterized at a second level by accessing the set of pixels of the footprint 501 (e.g., the pixels comprising the tile group 501) and determining covered pixels out of the set. For example, even though the footprint 501 covers the triangle 301, not all pixels comprising each tile may cover, or reside within, the graphics primitive.

The second level rasterization, or fine rasterization, now stamps out the individual covered pixels of the footprint 501. The fine rasterization process examines the pixels comprising the footprint 501 and determines which of those pixels are covered by the triangle 301. This is shown in FIG. 6 as the grid of 16 pixels (e.g., 4×4) comprising each tile of the footprint 501. Each of the 16 pixels of each tile are evaluated against the edges of the triangle 301. Depending upon the degree of accuracy desired, multiple sample points of each the pixel can be used in the evaluation. The result of the evaluation is the designation of the pixels of the footprint 501 that are covered by the polygon 301. The covered pixels are then output from the fine rasterization unit for further processing within subsequent stages of the GPU 110.

Figure 7:
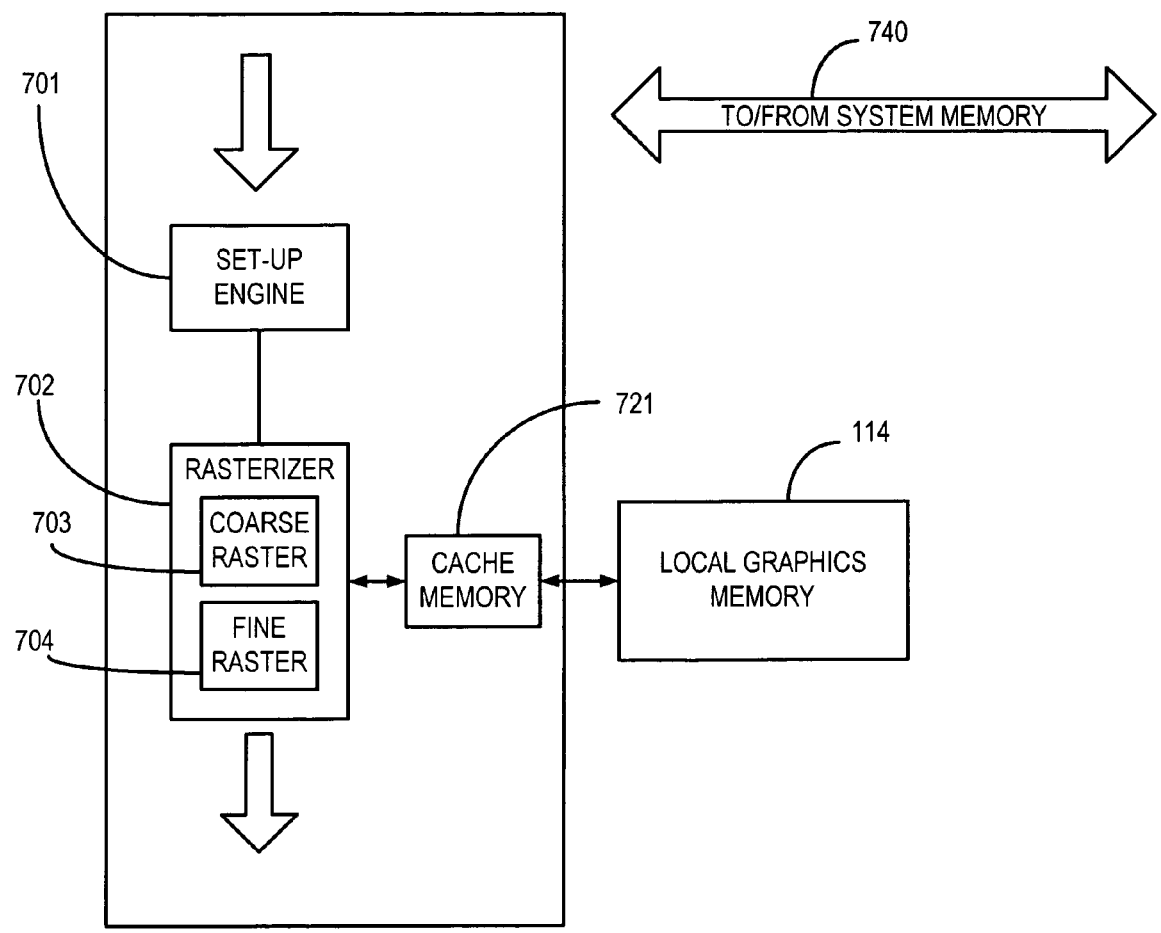
FIG. 7 shows a diagram of internal components of the GPU in accordance with one embodiment of the present invention.

FIG. 7 shows a diagram of internal components of the GPU 110 in accordance with one embodiment of the present invention. As shown in FIG. 7, the GPU 110 includes a setup engine 701 and a rasterizer unit 702. In the present embodiment, the functionality of the present invention is implemented within the hardware and software of the rasterizer unit 702. Generally, the set up unit 701 functions by converting descriptions based on vertices to descriptions based on edge descriptions. The rasterizer unit 702 subsequently converts these edge descriptions into filled areas comprising actual pixel descriptions (e.g., pixel areas, pixel sub-samples, etc.). The pixel descriptions are subsequently passed along to other units within the GPU 110 for further processing and rendering.

In the present embodiment, the rasterizer unit 702 includes a coarse raster component 703 and a fine raster component 704. The coarse raster component 703 implements the non-rectangular tile group rasterization process as described above, as it rapidly searches a grid of tiles to identify tiles of interest (e.g., tiles that are covered by a primitive). Once the tile groups of interest are identified, the fine raster component 704 individually identifies the pixels that are covered by the primitive. Hence, in such an embodiment, the coarse raster component 703 rapidly searches a grid of pixels by using tiles, and the fine raster component 704 uses the information generated by the coarse raster component 703 and implements fine granularity rasterization by individually identifying pixels covered by the primitive. In both cases, both the coarse raster component 703 and the fine raster component 704 can utilize one or more boustrophedonic patterns during their rasterization.

Referring still to FIG. 7, the GPU 110 further includes a cache memory 721 that functions by implementing high-speed low latency storage for the most frequently used graphics rendering data. Such data typically comprises texture information, vertex information, colors, and the like. The cache memory 721 is shown coupled to the local graphics memory 114. The cache memory 721 utilizes one or more cache maintenance mechanisms to maintain coherency with the local graphics memory 114. The arrow 740 shows the communications pathway between the GPU 110 and the system memory (e.g., memory 115 shown in FIG. 1).

In one embodiment, the hardware comprising the raster unit 702 is optimized for operations on a per clock basis. For example, to provide high throughput and thereby maintain high rendering frame rates, the coarse raster component 703 and the fine raster component 704 comprise hardware designed to implement the first level rasterization and the second level rasterization on a per-clock cycle basis. The rasterizer unit 702 can be implemented such that the first level rasterization is implemented in the coarse raster component 703 that "stamps out" tile groups (e.g., including nonsymmetric tile groups) covering a given primitive within a single clock cycle. Subsequently, the rasterization at the second level is implemented in the fine raster component 704 that stamps out the covered pixels of a tile group in a single clock cycle. Thus for example, hardware that can process 64 pixels per clock would use a 64 pixel footprint (e.g., four tiles of 16 pixels each) while hardware that can process 128 pixels per clock would use a 128 pixel footprint (e.g., eight tiles of 16 pixels each, four tiles of 32 pixels each, etc.). As described above, these tiles can be arranged in various different conglomerations (e.g., long skinny footprints, square footprints, rectangular footprints, diagonal footprints, "L" shaped footprints, and the like).

Figure 8:
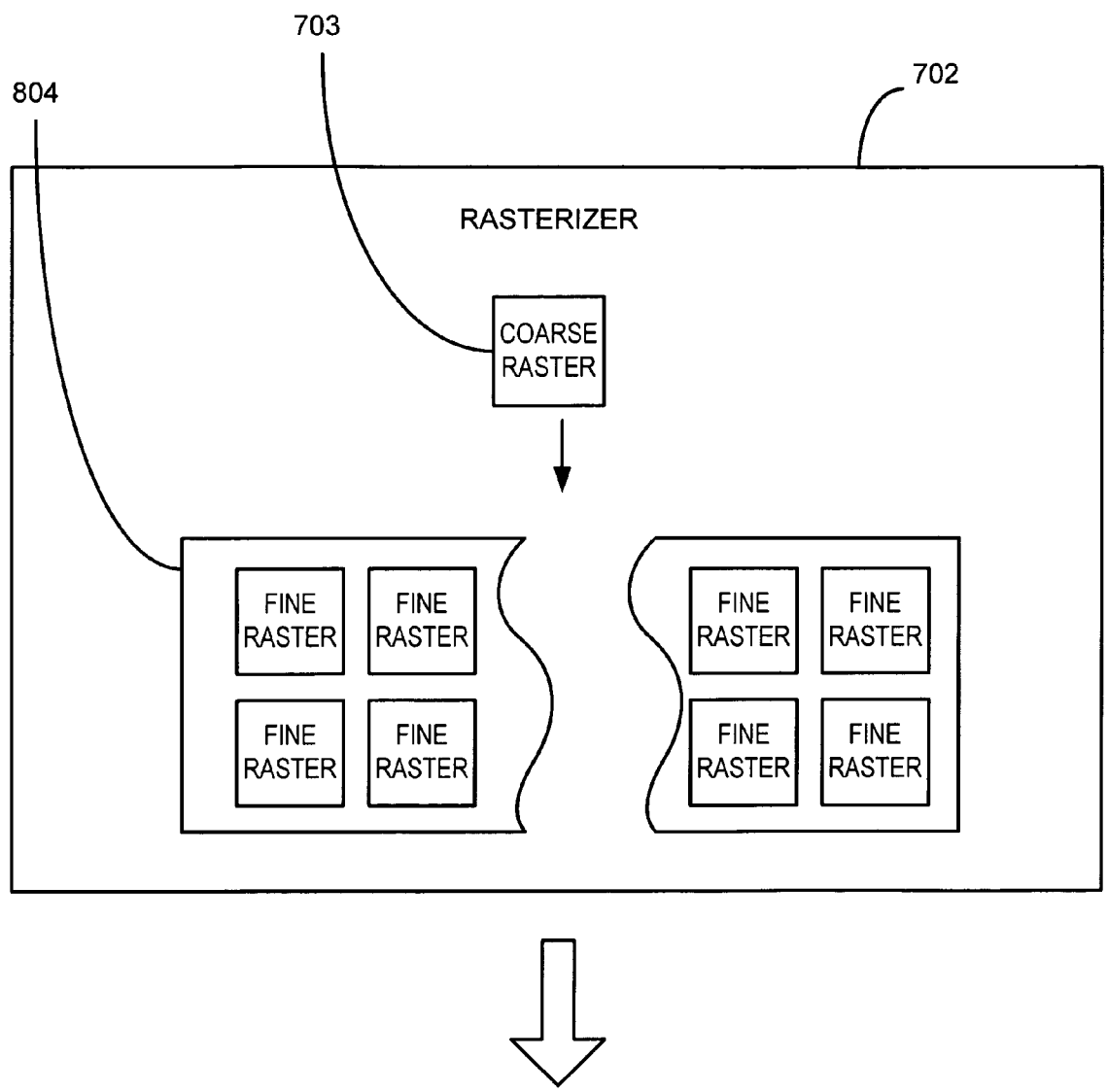
FIG. 8 shows a rasterizer unit in accordance with one embodiment of the present invention, wherein the rasterizer unit includes an array of a parallel fine raster units.

Parallel Fine Rasterization:

FIG. 8 shows the rasterizer unit 702 in accordance with one embodiment of the present invention, wherein the rasterizer unit includes an array 804 of parallel fine raster units.

In the FIG. 8 embodiment, the raster unit 702 includes the array 804 of parallel fine rasterization units. With respect to the coarse raster unit 703, the raster unit 702 functions substantially the same as described above in the discussion of FIG. 7. In other words, the coarse raster unit 703 receives graphics primitives (e.g., triangle polygons, etc.) for rasterization at a first level to generate a plurality of tiles of pixels. In the FIG. 8 embodiment, these titles are subsequently rasterized at a second level by allocating the tiles to the array 804.

For example, in an embodiment where the hardware of the raster unit 702 is optimized for high throughput on a per clock basis, the coarse raster component 703 stamps out tile groups comprising a number of tiles (e.g., four tiles, etc.), where each tile comprises a number of pixels (e.g., 32 pixels each, etc.), all on a per clock basis, as described above. These tile groups can be symmetric or nonsymmetric, in accordance with any particular rasterization mode or any particular primitive being rasterized. Subsequently, the tile groups are allocated to each of the plurality of fine raster units within the array 804. The parallel fine raster units are configured to perform the second level fine rasterization on the tiles received from the coarse raster unit 703. Depending upon the desired level of performance, the array 804 will vary in size and will have a smaller or larger number of the parallel fine raster units.

In one embodiment, the tiles can be allocated to the array 804 on a per fine raster unit basis (e.g., one tile per fine raster unit, or the like). Alternatively, portions of tiles (e.g., one quarter of a tile, half of a tile, or the like) can be allocated on a per rasterizer unit basis. In general, the rasterization work is preferably spread among the parallel fine raster units to balance the resulting work load evenly. Subsequently, the parallel fine raster units can stamp out the individual covered pixels of each tile and output the results on a per clock cycle basis.

Thus, for example, hardware that can process 128 pixels per clock would use a 128 pixel footprint (e.g., eight tiles of 16 pixels each). The coarse raster unit 703 would stamp out eight tiles per clock and allocate each of the resulting eight tiles to the eight fine raster units of the array 804. Each of the eight fine raster units will then stamp out the covered pixels of their respective allocated tile (e.g., up to the full 16 pixels).

Figure 9:
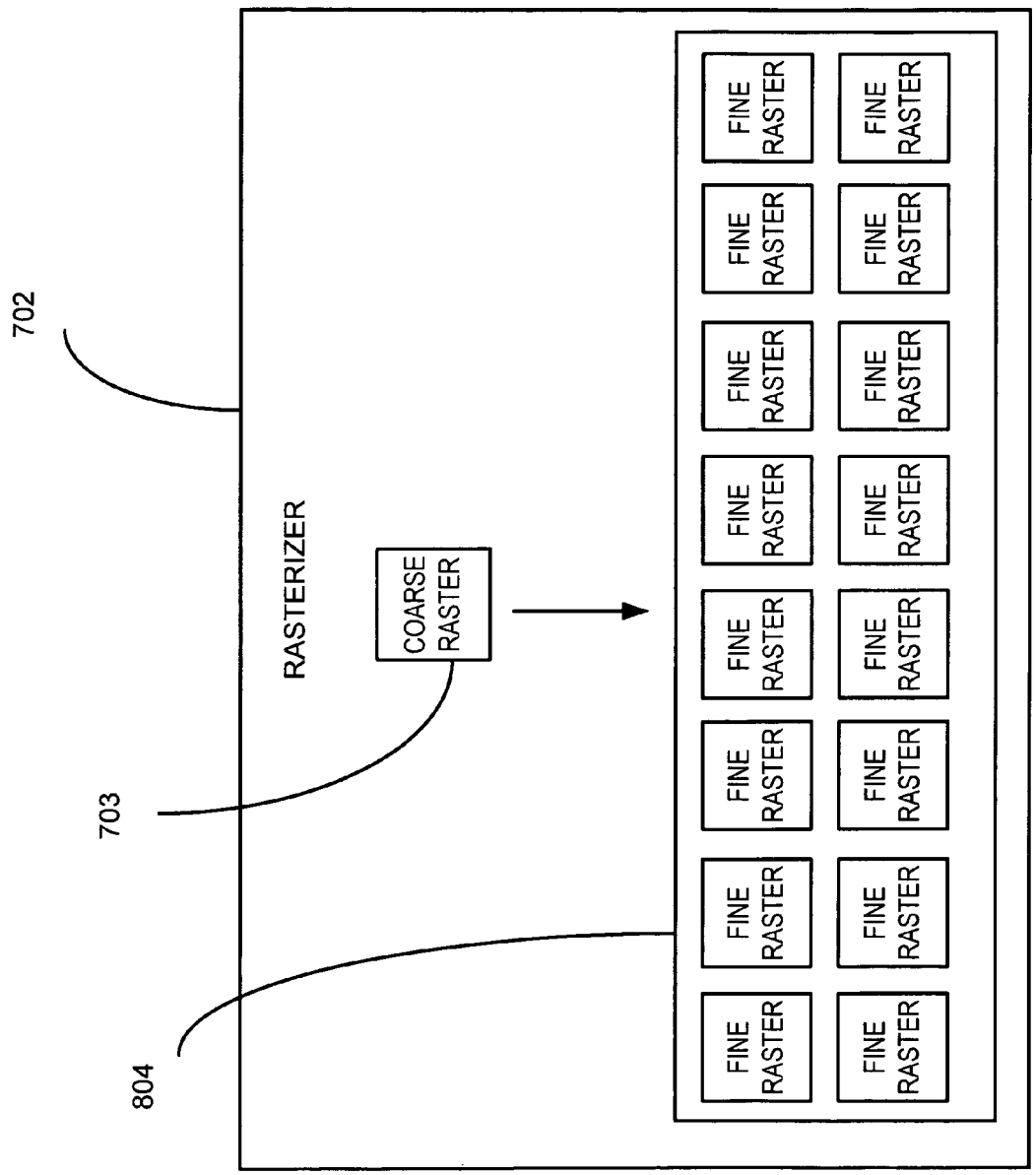
FIG. 9 shows a diagram of the rasterizer unit having an array of 16 fine raster units in accordance with one embodiment of the present invention.

FIG. 9 shows a diagram of the rasterizer unit 702 having an array 804 of 16 fine raster units in accordance with one embodiment of the present invention. FIG. 9 illustrates the manner in which the performance of the rasterizer 702 can be scaled up or scaled down in accordance with any appropriate desired performance target. For example, for high performance applications, the coarse raster unit 703 can be implemented to stamp out large numbers of tiles (e.g., 16 tiles of 16 pixels each, or the like) to deliver high pixel throughput (e.g., 256 pixels per clock) using an array 804 comprising 16 fine raster units. Such an embodiment is illustrated in FIG. 9. Alternatively, for low-power applications, the coarse raster unit 703 can be implemented to stamp out smaller numbers of tiles (e.g., four tiles of 16 pixels each, or the like) and use smaller numbers of fine raster units in the array 804 (e.g., four fine raster units).

In one embodiment, the plurality of fine raster units of the array 804 are each substantially identical to one another. This attribute enables the fine raster units to function in a symmetric multiprocessing execution manner, where the workload received from the coarse raster unit 703 can be allocated to any one of the fine raster units of the array 804 on a pro rated share basis. Additionally, this attribute also simplifies the workload balancing among the parallel fine raster units of the array 804. Groups of tiles, individual tiles, or sub portions of tiles can be allocated to each of the fine raster units such that the workload is balanced among them, and such that their outputs are completed at the same clock cycle.

FIG. 10 shows a diagram depicting an exemplary load-balancing method in accordance with one embodiment of the present invention. As depicted in FIG. 10, 140 blocks are shown in a 10×14 grid. Each of the blocks includes a numeral (e.g., 0-7) indicating the manner in which the work required to rasterize that tile is to be distributed. For example, in one embodiment, for an array comprising 8 raster units, the blocks will be distributed as numbered in the FIG. 10 diagram, resulting in a checkerboard pattern, so that each fine raster unit is assigned every eighth block. The blocks can comprise groups of tiles, individual tiles, or sub portions of tiles, as described above.

In an alternative embodiment, the grid of blocks can be assigned such that each of the fine raster units is assigned a slice of the grid. For example, each of the eight fine raster units can be assigned a column of the grid in accordance with the number of each of the blocks across the top row of the grid. Each fine raster unit will then rasterize the blocks of its assigned column. A similar arrangement can be implement using rows instead of columns, whereby each fine raster unit will rasterize the blocks of its assigned row. In this manner, a number of different allocation patterns can be implemented to efficiently balance the load among the fine raster units comprising the array.

Figure 11:
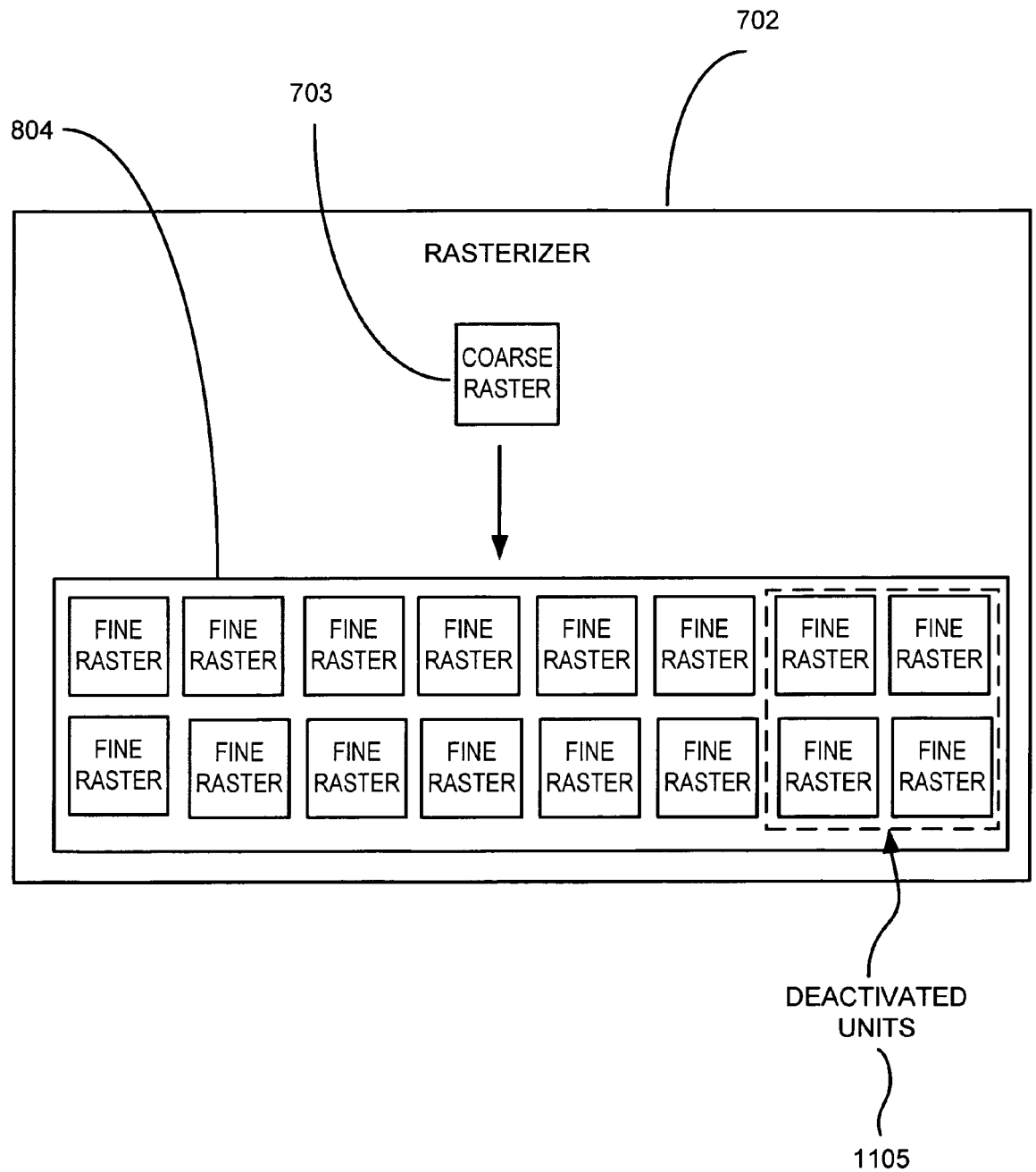
FIG. 11 shows a diagram depicting the rasterizer wherein a group comprising four fine raster units of the array have been deactivated in accordance with one embodiment of the present invention.

FIG. 11 shows a diagram depicting the rasterizer 702 wherein a group 1105 comprising four fine raster units of the array 804 have been deactivated in accordance with one embodiment of the present invention.

In the FIG. 11 embodiment, one or more of the fine raster units of the array 804 can be deactivated while the functionality of the remaining fine raster units of the array 804 is retained. One or more of the fine raster units of the array 804 can be deactivated for a number of different reasons. One such reason would be a case where one or more of the fine raster units is defective due to, for example, a manufacturing defect or the like. Another reason would be a case where the intended power consumption level of the overall GPU incorporating the array 804 dictates the deactivation of one or more of the fine raster units.

The ability to deactivate one or more of the fine raster units of the array 804 enables the inclusion of one or more redundant fine raster units into the array 804 to provide redundant capability in case of failure. For example, an additional number of fine raster units can be included into the array 804 even though the use of those additional fine raster units, if activated, would provide a performance level greater than the targeted performance level. Similarly, an additional number of fine raster units can be included into the array 804 even though, if activated, the capabilities of the raster units cannot be fully utilized by the throughput provided by the coarse raster unit 703 (e.g., as in a case where the throughput of the coarse raster unit 703 is a bottleneck). Such redundant one or more fine raster units can be activated and utilized in those cases where one or more of the other fine raster units of the array 804 is defective. For example, if two fine raster units are defective and inoperable, two redundant fine raster units can be activated, thereby maintaining the targeted performance level of the overall raster unit 702.

Figure 12:
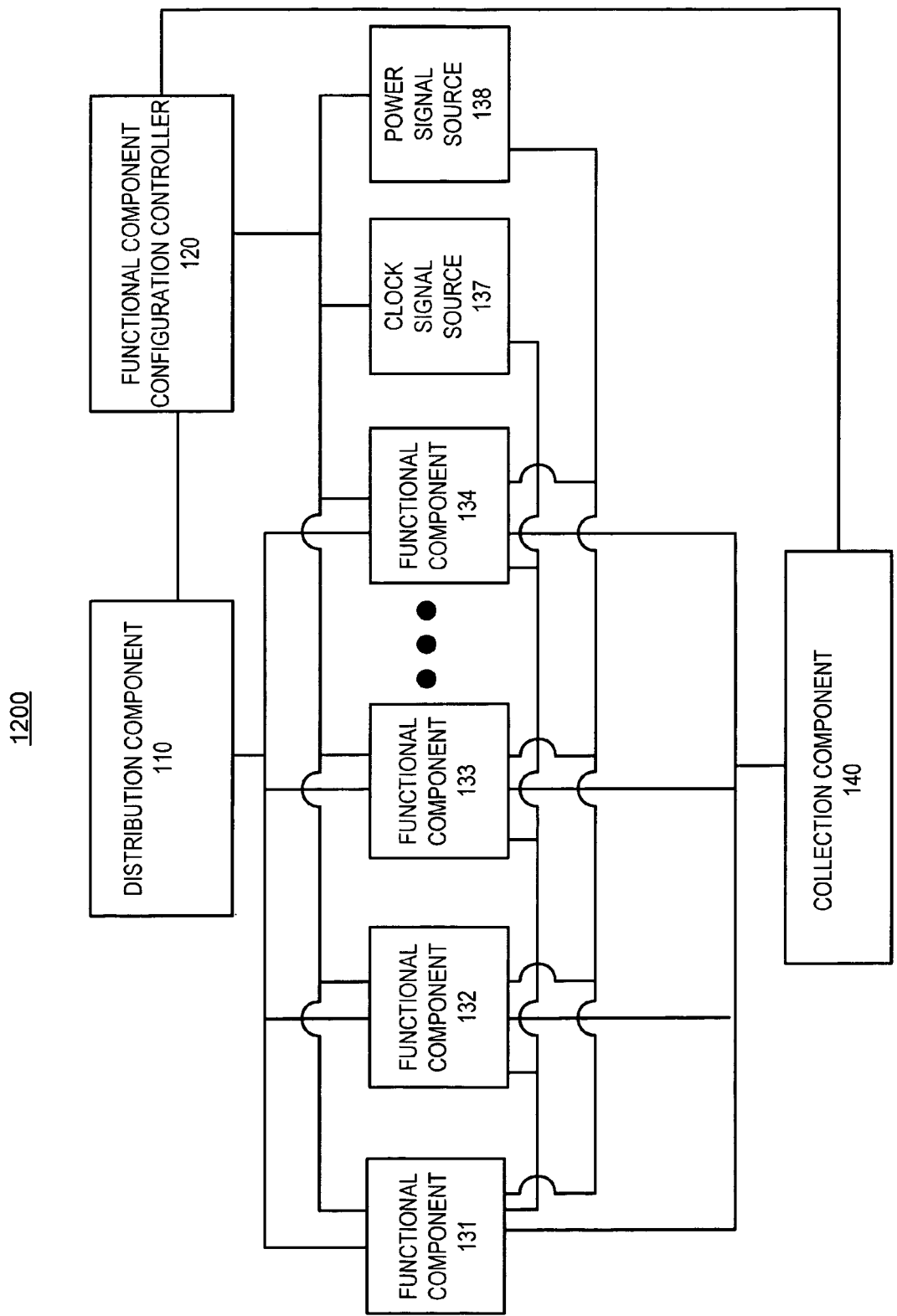
FIG. 12 shows a diagram depicting an exemplary architecture supporting the selective activation/deactivation of functional components in accordance with one embodiment of the present invention.

FIG. 12 shows a diagram 1200 depicting an exemplary architecture supporting the selective activation/deactivation of functional components in accordance with one embodiment of the present invention. Diagram 1200 shows a generalized integrated circuit in accordance with one embodiment of the present invention, illustrating the components that support the selective activation/deactivation of functional components. As used herein, the below described capability for flexibly configuring functional component operational characteristics (e.g., enable/disable a functional component, change clock speed, change operating voltage, etc.) is often referred to as selective functional component activation/deactivation.

Diagram 1200 shows a distribution component 119, functional component configuration controller 120, collection component 140 and functional components 131, 132, 133 and 134. Distribution component 119 is coupled to functional components 131, 132, 133 and 134, which are coupled to collection component 140. Functional component configuration controller 120 is coupled to distribution component 119, functional components 131, 132, 133 and 134, and collection component 140. In one embodiment, each of the functional components 131-134 are fine raster units of an array (e.g., array 804) as described above.

In the present FIG. 12 embodiment, the distribution component 119 selectively distributes information to functional components 131-134 (e.g., enabled functional components). This information can be a variety of information, such as, for example, workflow information comprising data for processing in association with a common objective (e.g., graphics related information such as tiles, as described above). In one exemplary implementation, distribution component 119 receives a single stream of workflow information or data (e.g., tile graphics data) and distributes the workflow information to functional components 131-134. In another exemplary implementation, the single stream of information is related to floating point calculations. In one embodiment, distribution component 119 can also receive multiple information streams and distribute the information to the functional components 131-134.

In the FIG. 12 embodiment, the collection component 140 "collects" the output or results from functional components 131-134 by concatenating and aggregating the results of the operations for use in achieving the common objective (e.g., aggregating results for communication to a graphics buffer). In another embodiment, the collection component 140 is a graphics buffer. In yet another embodiment, collection component 140 can aggregate the results of floating point calculations.

The components of diagram 1200 also cooperatively operate to flexibly configure functional component operational characteristics (e.g., enable/disable a functional component, change clock speed, change operating voltage, etc.). For example, functional component configuration controller 120 can disable or enable one or more functional components and notify the distribution component 119 of the change in operating characteristics (e.g., which of the functional components is enabled, disabled, etc.). In this manner, the functional component configuration controller 120 controls adjustments in operational characteristics (e.g., disable/enable, etc.) of one or more of the functional components 131-134 and can provide information to distribution component 119 and collection component 140 regarding the adjustment.

Additional descriptions regarding selective functional component activation/deactivation and the flexible configuration of functional component operational characteristics, such as enabling/disabling a functional component, change clock speed, change operating voltage, and the like can be found in commonly assigned U.S. patent application "A SYSTEM AND METHOD FOR INCREASING DIE YIELD" by John Montrym et al., filed on Dec. 18, 2003, application Ser. No. 10/740,723, which is incorporated herein in its entirety.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. In a raster stage of a graphics processor, a method for parallel fine rasterization comprising:

receiving a graphics primitive for rasterization in a raster stage of a graphics processor;

rasterizing the graphics primitive at a first level by using a first level rasterization unit to isolate a plurality of tiles sets within the graphics primitive, wherein each tile set comprises a plurality of pixels, wherein a first tile set of the plurality of tile sets corresponds to a second tile set based on a tile grouping formation determined for the graphics primitive, wherein the rasterizing at the first level is implemented on a per clock cycle basis;

receiving the tile sets isolated by the coupled first level rasterization unit and rasterizing the tiles sets at a second level by allocating the tile sets to an array of parallel second-level rasterization units to generate covered pixels; and outputting the covered pixels for rendering operations in a subsequent stage of the graphics processor, wherein the array of parallel second-level rasterization units are capable of selective functional component activation, and wherein the selective functional component activation is operable to be responsive to an overall power consumption level of the graphics processor and wherein the selective functional component activation is operable to activate or deactivate a functional second level rasterization unit in relation to a target performance level of the rendering operations.

2. The method of claim 1 wherein the rasterizing at the second level using the array is implemented on a per clock cycle basis.

3. The method of claim 1 wherein rasterizing at the first level is implemented in a coarse raster unit and the array comprises a plurality of parallel fine rasterization units.

4. The method of claim 3 wherein the plurality of fine rasterization units are substantially identical.

5. The method of claim 1 wherein the plurality of tiles are allocated to the array of parallel second-level rasterization units to balance a workload among the second-level rasterization units.

6. The method of claim 1 wherein at least one of the parallel second-level rasterization units is deactivated.

7. The method of claim 6, wherein the at least one parallel second rasterization unit is deactivated due to a fault condition.

8. The method of claim 1 wherein at least one of the parallel second-level rasterization units is a redundant rasterization unit providing a redundant second-level rasterization capability.

9. The method of claim 1 wherein the array of parallel second-level rasterization units are capable of user implemented selective functional component activation.

10. The method of claim 1 wherein the power consumption level of the array of parallel second-level rasterization units is a target power consumption level.

11. A GPU (graphics processor unit), comprising:
a set-up unit for generating polygon descriptions;
a rasterizer unit coupled to the set-up unit for rasterizing the polygon descriptions;
a coarse raster unit within the rasterizer unit for rasterizing a graphics primitive at a first level by isolating a plurality of tiles sets, wherein each tile set comprises a plurality of pixels related to the graphics primitive, wherein a first tile set of the plurality of tile sets corresponds to a second tile set based on a tile grouping formation determined for the graphics primitive, wherein the rasterizing at the first level is implemented on a per clock cycle basis; and
an array of parallel fine raster units within the rasterizer unit for receiving the tiles sets isolated by the coupled coarse raster unit and for rasterizing the tile sets at a second level, wherein the tile sets are allocated to the parallel second-level rasterization units to generate covered pixels, and wherein the covered pixels are output for rendering operations in a subsequent stage of the GPU, wherein the array of parallel second-level rasterization units are capable of selective functional component activation, and wherein the selective functional component activation is operable to be responsive to an overall power consumption level of the GPU and wherein the selective functional component activation is operable to activate or deactivate a functional second level rasterization unit in relation to a target performance level of the rendering operations.

12. The GPU of claim 11 wherein the rasterizing at the second level using the array is implemented on a per clock cycle basis.

13. The GPU of claim 11 wherein the array of parallel second-level rasterization units are capable of user implemented selective functional component deactivation.

14. The GPU of claim 11 wherein the plurality of tiles are allocated to the array of parallel second-level rasterization units to balance a workload among the second-level rasterization units.

15. The GPU of claim 11 wherein at least one of the parallel second-level rasterization units is deactivated.

16. The GPU of claim 15 wherein the at least one of the parallel second-level rasterization units is deactivated to reduce power consumption of the GPU.

17. The GPU of claim 11 wherein at least one of the parallel second-level rasterization units is a redundant rasterization unit providing a redundant second-level rasterization capability.

18. A computer system, comprising:
a system memory;
a central processor unit coupled to the system memory; and
a graphics processor unit communicatively coupled to the central processor unit;
a set-up unit within the graphics processor unit for generating polygon descriptions;
a rasterizer unit within the graphics processor unit and coupled to the set-up unit for rasterizing the polygon descriptions; and
a coarse raster unit within the rasterizer unit for rasterizing a graphics primitive at a first level by isolating a plurality of tiles sets, wherein each tile set comprises a plurality of pixels related to the graphics primitive, wherein a first tile set of the plurality of tile sets corresponds to a second tile set based on a tile grouping formation determined for the graphics primitive, wherein the rasterizing at the first level is implemented on a per clock cycle basis; and
an array of parallel fine raster units within the rasterizer unit for receiving the tiles sets isolated by the coupled coarse raster unit and rasterizing the tile sets at a second level, wherein the tile sets are allocated to the parallel second-level rasterization units to generate covered pixels, and wherein the covered pixels are output for rendering operations in a subsequent stage of the GPU, wherein the array of parallel second-level rasterization units are capable of selective functional component activation, and wherein the selective functional component activation is operable to be responsive to an overall power consumption level of the graphics processor unit and wherein the selective functional component activation is operable to activate or deactivate a functional second level rasterization unit in relation to a target performance level of the rendering operations.

19. The system of claim 18 wherein the array of parallel second-level rasterization units are capable of selective functional component activation/deactivation.

* * * * *